US005211027A

United States Patent [19]
Lofting et al.

[11] Patent Number: 5,211,027
[45] Date of Patent: May 18, 1993

[54] TEMPERATURE CONTROL SYSTEMS FOR VEHICLES

[75] Inventors: Alan R. Lofting, Sandown; James G. Burlison, Southampton, both of United Kingdom

[73] Assignee: Temperature Limited, Dewar Close, United Kingdom

[21] Appl. No.: 781,132

[22] PCT Filed: Jun. 22, 1990

[86] PCT No.: PCT/GB90/00971

§ 371 Date: Jan. 17, 1992

§ 102(e) Date: Jan. 17, 1992

[87] PCT Pub. No.: WO91/00205

PCT Pub. Date: Jan. 10, 1991

[30] Foreign Application Priority Data

Jun. 23, 1989 [GB] United Kingdom ............... 8914423

[51] Int. Cl.⁵ .............................................. B60H 1/32
[52] U.S. Cl. ............................................ 62/244; 62/305
[58] Field of Search ................ 62/506, 305, DIG. 16, 62/244; 310/68 C

[56] References Cited

U.S. PATENT DOCUMENTS

| | | | |
|---|---|---|---|
| 1,954,543 | 4/1934 | Schwarz | 62/506 X |
| 3,320,762 | 5/1967 | Murdock | 62/506 X |
| 3,498,072 | 3/1970 | Stiefel | 62/506 X |
| 3,926,000 | 12/1975 | Scofield | 62/506 X |
| 3,959,675 | 5/1976 | Lautner et al. | 310/68 C |
| 3,995,443 | 12/1976 | Iversen | 62/305 |
| 4,926,655 | 5/1990 | King | 62/DIG. 16 |

Primary Examiner—William E. Tapolcai
Attorney, Agent, or Firm—Donald S. Holland

[57] ABSTRACT

A system for controlling the temperature of the interior of a vehicle, e.g., a railway carriage, comprising a refrigerant circuit (18) having an evaporator (21) through which air is passed to outlets (24) to the interior of the vehicle. A condenser (25) of the refrigerant circuit (18) is cooled by liquid-containing pipes which extend over the entire height of the vehicle to a liquid/air heat exchanger (19). The refrigerant unit is arranged in or on the roof of the vehicle and heat exchanger (19) is arranged on or under the floor of the vehicle, or vice versa.

7 Claims, 4 Drawing Sheets

TEMPERATURE CONTROL SYSTEMS FOR VEHICLES

BACKGROUND OF THE INVENTION

The present invention relates to temperature control systems for vehicles, for example air conditioning systems for railway carriages.

There is an increasing demand for the air conditioning of railway carriages in order to improve passenger comfort. In view of the very substantial number of carriages in operation and the long life of such carriages, it is essential that any such system must be comparatively inexpensive and with a reasonable life expectancy and easy maintenance.

There have previously been two main proposals for air conditioning such carriages In one proposal, a complete air-cooled air conditioning unit is slung beneath a floor of the carriage in the ambient air and the cooled air produced by the system is ducted into the carriage. This system has the disadvantage, however, that the necessary air ducting is bulky and expensive to install.

A second previously proposed system mounts a refrigerating circuit of the air conditioning system on the roof of the carriage within the space to be cooled. The refrigerant is then led by pipes to a refrigerant/air heat exchanger slung beneath the floor of the carriage in the ambient air. This arrangement has the disadvantage that the refrigerant must be conveyed by pipes between the roof and the floor of the carriage. There is a strong possibility that, in time, refrigerant will leak from these pipes and such leaks, in view of the refrigerants currently used, have an adverse effect on the environment. In addition, such leaks are difficult to trace and repair.

The present invention seeks to overcome or reduce one or more of the above disadvantages.

SUMMARY OF THE INVENTION

According to the present invention there is provided in a vehicle a system for controlling the temperature of the interior of the vehicle by supplying air through one or more outlets into the interior, characterized in that it comprises a refrigerant circuit which is thermally linked to a second liquid-containing circuit which incorporates a liquid/air heat exchanger, the refrigerant circuit being carried by or adjacent to either the roof or the floor of the vehicle, and the heat exchanger being carried by or adjacent to the other of the roof and floor of the vehicle and the second liquid-containing circuit comprising pipes to and from the heat exchanger which extend over a substantial part of the height of the vehicle.

When the vehicle is being cooled, the heat exchanger is in the form of a heat rejection unit.

In one preferred arrangement the refrigerant in the refrigerant circuit is thermally linked to the second liquid-containing circuit by means of a condenser, said pipes extending from the condenser to the heat exchanger, and the refrigerant circuit comprises an evaporator over which air is passed to said outlets. The condenser may be replaced by any convenient liquid/refrigerant heat exchanger.

In another preferred arrangement the refrigerant in the refrigerant circuit is thermally linked to the second liquid-containing circuit by means of a second heat exchanger, said pipes extending from the second heat exchanger to the first heat exchanger, and the air being passed from the first heat exchanger to said outlets, the refrigerant circuit further comprising a refrigerant/air heat exchanger Thus when the vehicle is being cooled, the refrigerant is air-cooled and the first heat exchanger may be in the form of a chilled liquid coil.

BRIEF DESCRIPTION OF THE DRAWINGS

Preferred embodiments of the present invention will now be described, by way of example only, with reference to the accompanying drawings, of which.

DETAILED DESCRIPTION OF THE PREFERRED EMBODIMENTS

Figure 1:
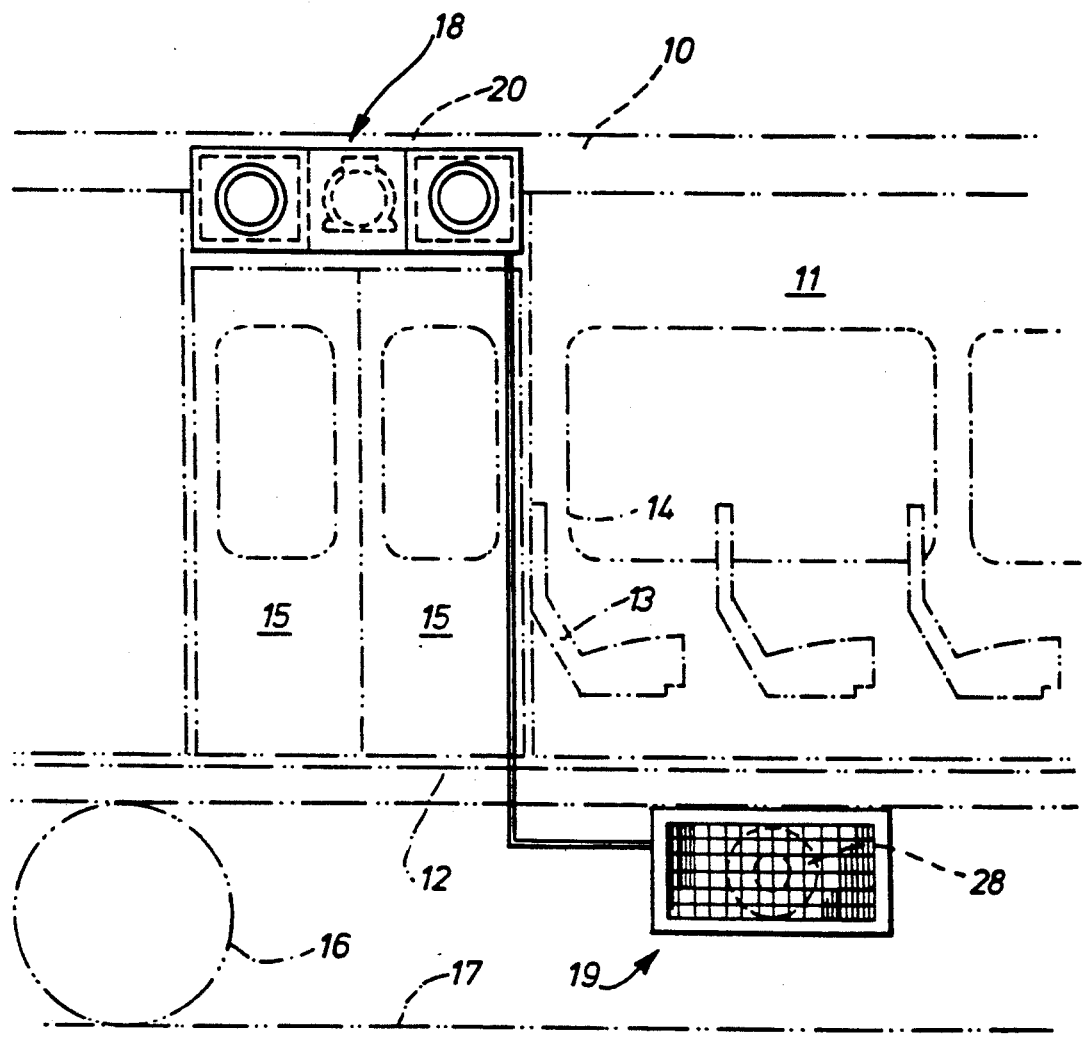
FIG. 1 is a schematic cut-away side view of a railway carriage (shown in broken lines) incorporating a temperature control system in accordance with a first embodiment of the present invention.

As seen in FIG. 1, the railway carriage has a roof 10, sidewalls, one of which is shown at 11, and a floor 12 carrying passenger seats 13. The sidewall is provided with windows 14 and doors 15 in conventional manner. The carriage is mounted on wheels, one of which is shown at 16 which runs on a track 17.

Figure 2:
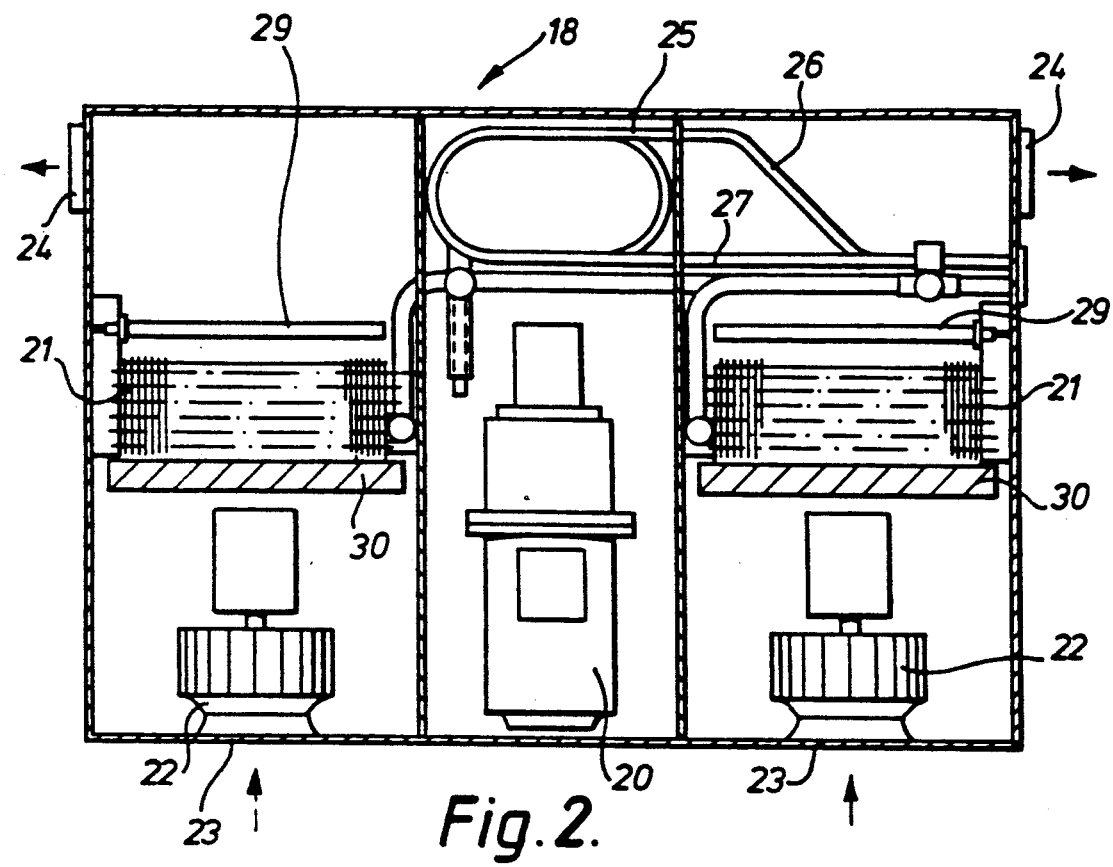
FIG. 2 is a plan view from above of the refrigerant circuit of the system of FIG. 1.
Figure 4:
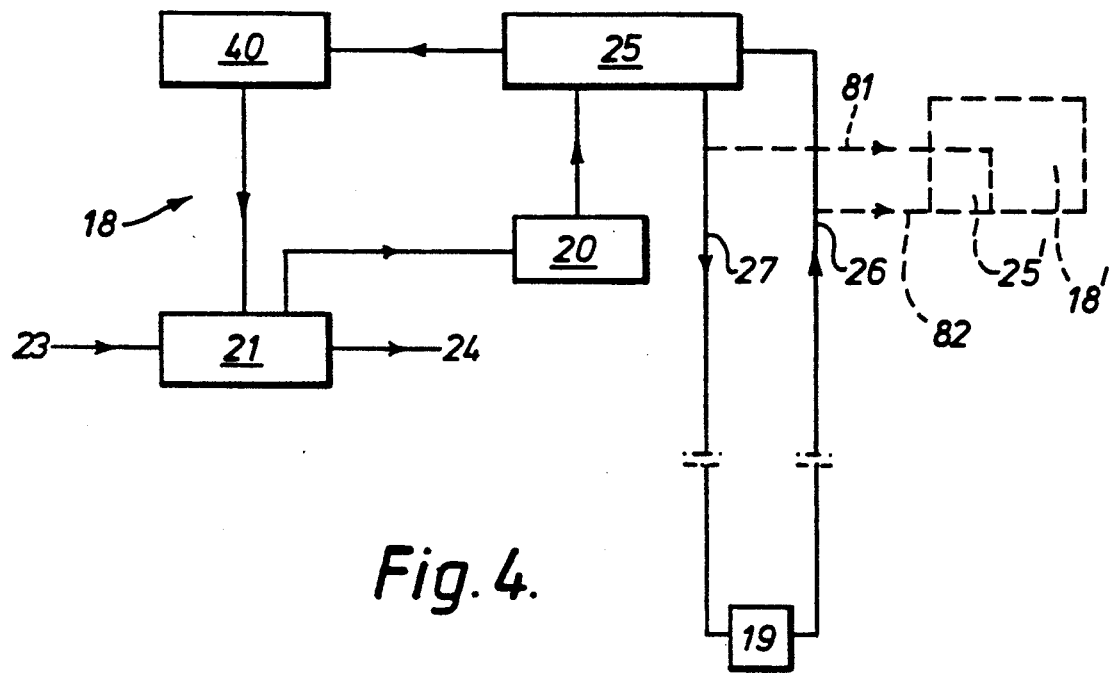
FIG. 4 illustrates the principal of operation of the system of FIG. 1.

The air conditioning system comprises a refrigerating circuit 18 and a water-air heat exchanger 19. As seen in FIG. 2, the refrigerating circuit 18 is mounted above the doors 15 and includes a rotary vane compressor 20, driven by an electric motor, an expansion device 40, FIG. 4, and two evaporator coils 21. Respective fans 22 draw in air from the carriage via inlets 23 and force air through the evaporator coils 21. The cooled air so produced is then passed into the carriage via outlets 24. To avoid draughts in the carriages, the cooled air is arranged to leave the outlets with low velocity, so that the emerging air falls substantially vertically.

Gaseous (evaporated) refrigerant leaves the evaporator coils 21 and passes to the compressor 20. It is then driven by the compressor 20 to a water-cooled condenser coil 25, where it is condensed by heat loss to water fed to the condenser coil 25 by a pipe 26. The liquid refrigerant is then passed through the expansion device 40 before returning to the evaporator coils 21.

The electricity supply for the, motor of compressor 20 is a single phase supply derived from the tertiary winding of the main train transformer. The motor operates satisfactorily from a fixed frequency supply over the whole range between 160 volts and 265 volts. If the voltage falls below 160 volts, there is a danger of the motor stopping and overheating; accordingly a thermal switch in the form of a bi-metallic strip is incorporated in the motor winding.

The refrigerant may be HCFC refrigerant R22.

Figure 3:
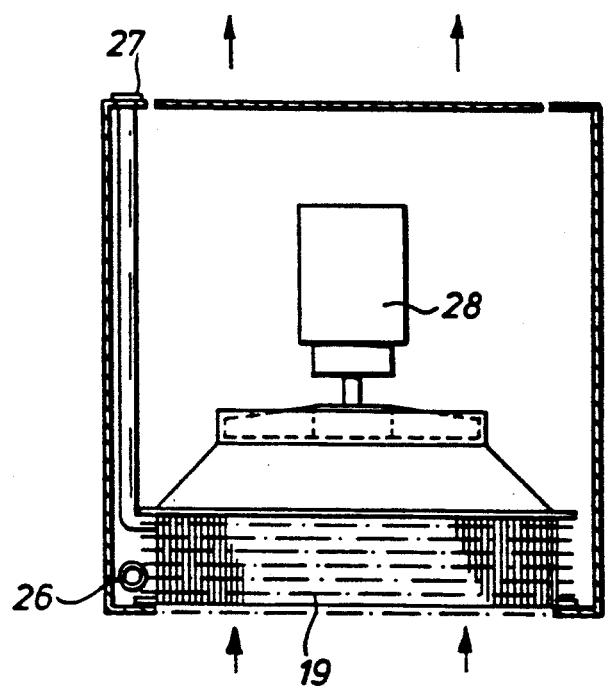
FIG. 3 is a plan view of the liquid/air heat exchanger of the system of FIG. 1.

The condenser coil 25 includes a water circuit, the inlet of which is connected to the pipe 26. The outlet to the water circuit is connected to a second pipe 27. These two pipes 26, 27 pass down through the wall of the carriage (see FIG. 3) to the underfloor where they are connected to the water/air heat exchanger 19. Pipe 26 is connected to the outlet of the water/air heat exchanger 19 and the pipe 27 is connected to the inlet of the water/air heat exchanger 19. A fan 28 is provided for the forced passage of air over the water/air heat exchanger 19 in order to provide forced cooling of the water.

The arrangement described above provides cool air at outlets 24. An electric heater element 29 is provided at the downstream side of each evaporator coil 21, so that heated air can be provided in winter, with the remainder of the refrigerating circuit 18 inactive. An air filter 30 is provided over the upstream face of each of the evaporator coils 21.

An advantage of the above described system is that the refrigerant is contained entirely within the refrigerating circuit 18. Accordingly, the possibility of refrigerant leaks is minimised or substantially eliminated. The only fluid which passes between the floor 12 and the roof 10 of the carriage, and vice versa, is water. If there is any leakage of water, this has no environmental disadvantages and the water pipes 26, 27 can be quickly and easily repaired. The provision of water pipes 26, 27 between the floor 12 and roof 10 of the carriage is cheap and inexpensive and takes up very little room. Moreover, only a relatively small amount of refrigerant, e.g. 1.5 Kg, is required compared with the large amount needed for a conventional system, e.g. 20 Kg.

The system may be readily retro-fitted to an existing carriage. The system is energy-saving compared to previous systems and also has the advantage of low weight. The fact that a power conversion assembly is not required leads to a 10-20% saving in energy and up to a 30-40% saving in weight; the compact design of the system leads to a further 15% weight saving and, particularly in view of the rotary-vane compressor, a further 25%, energy saving.

The system is conveniently configured as a number of separate modules which, together with the ease of access, considerably facilitates maintenance, repair and replacement.

The single phase motor used has the advantage of robustness. Since it has no complicated electronic control apparatus, it can resist high voltage transients, e.g. of 400 volts, with no problems. The use of a bi-metallic strip as built-in thermal protection permits an otherwise standard motor to be employed. Since it is rare for the system not to be operating, there is no need to make provision for any back-up temperature control. In any case, the thermal inertia of a railway carriage is quite high, so the system can be inoperative for several minutes with no noticeable effect.

The use of a rotary-vane compressor has the advantage of low starting and operating torque. An electric rail track has neutral or dead sections of up to 40 meters between powered sections, but the compressor 20 provides a flywheel effect to maintain satisfactory operation during passage over a neutral section. The starting and operation of the compressor is surprisingly quiet.

Numerous modifications can be made to the above described system. For example the water may contain an additive such as glycol; indeed any suitable non-corrosive liquid can be used in the second liquid-containing circuit.

Figure 6:
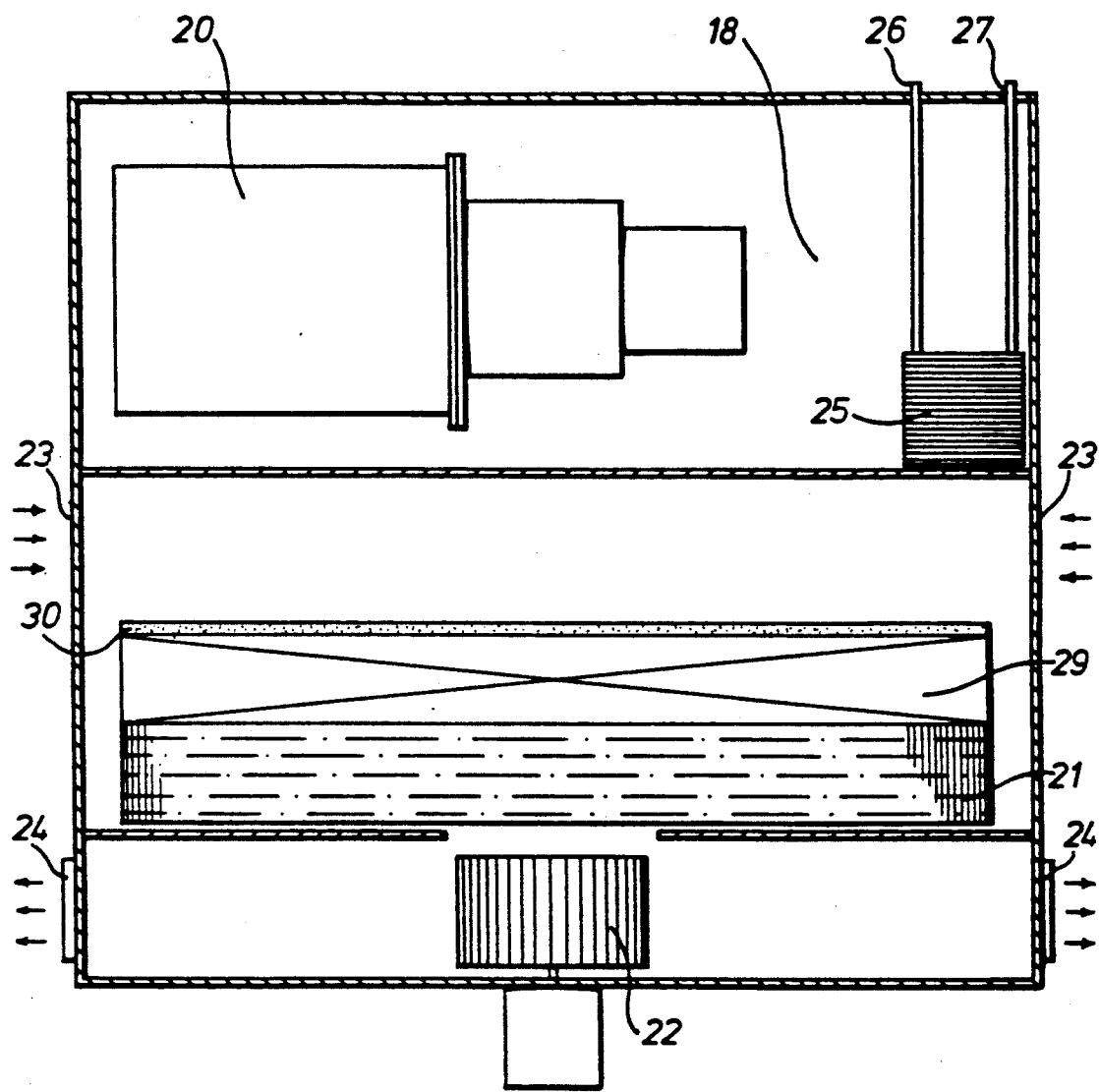
FIG. 6 shows a modification of the refrigerant circuit of FIG. 2.

It will be appreciated that the water/air heat exchanger 19 may be fed by a number of refrigerant circuits 18. The refrigerant circuit 18 and the water/air heat exchanger 19 may be modified in any way customary in the art. In particular the refrigerant circuit shown in FIG. 6 may be employed which has only a single evaporator coil 21 and an associated fan.

A d.c. motor may be used to drive the system. Since this is heavy, it is mounted with the compressor and the rest of the refrigerant circuit 18 underneath the floor of the carriage; in this case the water/air heat exchanger 19 is mounted within the roof space.

The refrigerant circuit 18 may take the form of a reverse cycle heat pump, in which case the water circuit incorporates a primary heating source using energy from any available source on the carriage. The term "refrigerant" in the present specification should be construed accordingly.

If desired, a single refrigerant circuit may supply a plurality of evaporator coils 21 spaced along the carriage; this enables the individual coil units to be smaller and to require quieter fans.

In overhead supply systems for railways, space is short underneath the carriage carrying the pantograph; the present system may be advantageously so modified that this carriage does not need to carry a heat rejection unit 19. Instead the modified arrangement indicated in broken lines in FIG. 4 may be employed in which the condenser 25' of refrigerant circuit 18, of the pantograph carriage shares the heat rejection unit 19 of an adjacent carriage Only water pipes 81,82 need to extend between the carriages. This arrangement may be extended so that the refrigerant units of three or more carriages may be served by any lower number of heat rejection units 19, including the case of a single heat rejection unit.

Figure 5:
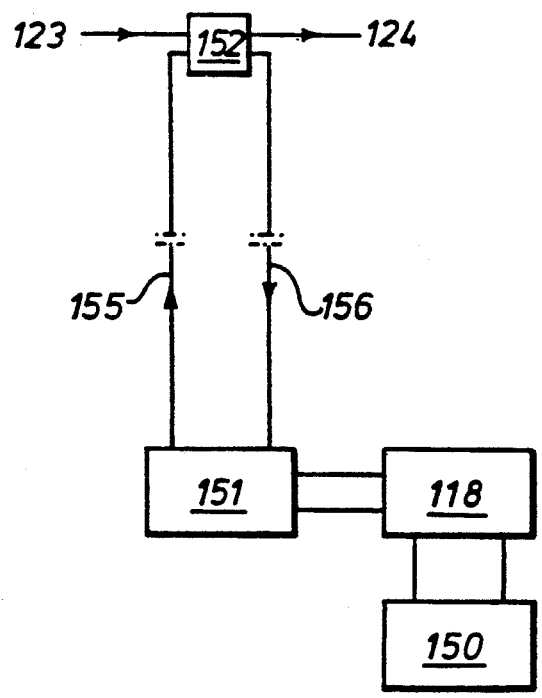
FIG. 5 illustrates the principal of operation of a second embodiment of the present invention.

In the modification of FIG. 5, refrigerant circuit 118 is mounted underneath the carriage and is cooled by ambient air at 150. A refrigerant/water heat exchanger 151 is also included in the underframe package and supplies cooled water up through a pipe 155 in the wall of the carriage to an air/water heat exchanger 152 in the form of a chilled water coil over which air is passed from inlet 123 to outlet 124 to the passenger space. Pipe 156 returns the water to exchanger 151.

This arrangement also has the advantage that there is no passage of refrigerant between floor and roof and so the danger of refrigerant leakage is minimised. Also, the need is avoided to duct cooled air for long distances within the passenger space.

The same modifications may be made to the arrangement of FIG. 5 as with the arrangement of FIGS. 1 to 4. Moreover the heat exchanger 152 may be replaced by a plurality of individual heat exchangers distributed along the carriage , e.g. in respective compartments, with common and/or individual thermostatic control elements. An additional loop may be provided incorporating a primary heat source, using energy from any available source on the carriage. This loop incorporates further water/air heat exchangers located downstream of the cooling water/air heat exchangers and control means are provided for preventing both the heating and cooling exchangers from operating simultaneously.

Besides single phase and d.c. motors, the system may employ a three phase motor or a hydraulic or pneumatic motor in suitable circumstances. The temperature control system can be used in goods wagons and also in road vehicles, especially lorries or coaches, and aircraft.

Having thus described the invention, what is claimed is:

1. In a vehicle, a system for controlling the temperature of the interior of the vehicle by supplying air through one or more outlets into said interior, wherein the system comprises a refrigerant circuit, said refrigerant circuit being thermally-linked to a second liquid-containing circuit, and said refrigerant circuit comprising at least the following elements: a compressor, at least one evaporator, a condenser, and interconnecting refrigerant pipes; all said refrigerant circuit elements being relatively closely located to each other, and said condenser constituting said thermal link between said refrigerant circuit and said second liquid-containing circuit, said second liquid-containing circuit incorporating a liquid/air heat exchanger and pipes interconnecting said condenser and said heat exchanger, all said refrigerant circuit elements being carried by or adjacent to either the roof or the floor of the vehicle and said heat exchanger being carried by or adjacent to the other of the roof and floor of the vehicle, and said second liquid-containing circuit pipes extending over a substantial part of the height of the vehicle.

2. A system according to claim 1, and comprising means for passing air through said evaporator to said outlets.

3. A system according to claim 2, wherein a plurality of evaporators and respective outlets are provided at spaced locations within the vehicle.

4. A system according to claim 1, wherein the refrigerant circuit is in the form of a reverse cycle heat pump.

5. A train comprising a plurality of carriages, at least one of which is provided with a system according to claim 1 wherein the liquid/air heat exchanger is shared between adjacent carriages, the arrangement being such that the only parts of the system which extend between the carriages are couplings (81, 82) comprising parts of the second liquid-containing circuit.

6. In a vehicle, a system for controlling the temperature of the interior of a vehicle by supplying air through one or more outlets into said interior, wherein the system comprises a refrigerant circuit, said refrigerant circuit being thermally linked to a second liquid-containing circuit and said refrigerant circuit including the following elements: a refrigerant/air heat exchanger, a second heat exchanger and interconnecting refrigerant pipes; all said refrigerant circuit elements being relatively closely located to each other, and said second heat exchanger constituting said thermal link between said refrigerant circuit and said second liquid-containing circuit, said second liquid-containing circuit comprising a liquid/air heat exchanger and pipes interconnecting said second heat exchanger and said liquid/air heat exchanger, all said refrigerant circuit elements being carried by or adjacent to either the roof or floor of the vehicle and said liquid/air heat exchanger being carried by or adjacent to the other of the roof and floor of the vehicle, sand said second liquid-containing circuit pipes extending over a substantial part of the height of the vehicle.

7. A system according to claim 6, wherein a plurality of liquid/air heat exchangers and respective outlets are provided at spaced locations within the vehicle.

* * * * *